United States Patent
Pan et al.

(10) Patent No.: US 12,392,013 B2
(45) Date of Patent: Aug. 19, 2025

(54) METHOD AND APPARATUS FOR SODIUM SLAG RECOVERY

(71) Applicants: BEIJING UNIVERSITY OF CHEMICAL TECHNOLOGY, Beijing (CN); INNER MONGOLIA RUIXIN CHEMICAL CO., LTD, Inner Mongolia (CN)

(72) Inventors: Junqing Pan, Beijing (CN); Qiuchen Wang, Beijing (CN); Keyu Wang, Beijing (CN); Yan Chen, Inner Mongolia (CN); Yanzhi Sun, Beijing (CN)

(73) Assignees: BEIJING UNIVERSITY OF CHEMICAL TECHNOLOGY, Beijing (CN); INNER MONGOLIA RUIXIN CHEMICAL CO., LTD, Inner Mongolia (CN)

( * ) Notice: Subject to any disclaimer, the term of this patent is extended or adjusted under 35 U.S.C. 154(b) by 502 days.

(21) Appl. No.: 18/070,250

(22) Filed: Nov. 28, 2022

(65) Prior Publication Data

US 2023/0332271 A1    Oct. 19, 2023

(30) Foreign Application Priority Data

Apr. 14, 2022    (CN) .......................... 202210394618.5

(51) Int. Cl.
*C22B 26/10*    (2006.01)
*C22B 1/02*    (2006.01)
(Continued)

(52) U.S. Cl.
CPC ............... *C22B 26/10* (2013.01); *C22B 1/02* (2013.01); *C22B 7/008* (2013.01)

(58) Field of Classification Search
None
See application file for complete search history.

(56) References Cited

FOREIGN PATENT DOCUMENTS

| CN | 2846436 Y | 12/2006 |
|---|---|---|
| CN | 2846437 Y | 12/2006 |

(Continued)

OTHER PUBLICATIONS

Nie et al. (Ningxia Yinchuan Sodium Factory, Mar. 12-14, 1994). (Year: 1994).*

*Primary Examiner* — Yun Qian
(74) *Attorney, Agent, or Firm* — Maine Cernota & Curran (57) ABSTRACT

The present disclosure relates to the field of the preparation of high purity sodium and the safe treatment of sodium calcium slag, and discloses a method and apparatus for sodium slag recovery by using gravity separation—controllable combustion—alkaline liquor leaching process for the preparation of high purity sodium and safe treatment of sodium calcium slag. The method comprises the following steps: (1) subjecting a liquid sodium slag to a gravity stratification to obtain pure metallic sodium and high calcium content sodium slag; (2) roasting the high calcium content sodium slag to obtain a roasting slag; and (3) leaching the roasting slag by using an alkaline liquor to obtain the sodium hydroxide solution and calcium hydroxide. The method and apparatus provided by the present disclosure have advantages including high efficiency separation of sodium and calcium, saving separation time, safe and controllable production process, and continuous production process, thereby providing a safe and efficient method for the preparation of high purity sodium and safe treatment of new sodium calcium slag generated by the method, allowing continuous production of high purity sodium and safe recycle of new sodium calcium slag.

19 Claims, 1 Drawing Sheet

(51) Int. Cl.
*C22B 7/00* (2006.01)
*C22B 7/04* (2006.01)

(56) References Cited

FOREIGN PATENT DOCUMENTS

| | | |
|---|---|---|
| CN | 102634671 A | 8/2012 |
| CN | 203487209 U | 3/2014 |
| CN | 203668481 U | 6/2014 |
| CN | 103667708 B | 9/2015 |
| CN | 105821217 A | 8/2016 |
| CN | 109371250 A | 2/2019 |
| CN | 208562194 U | 3/2019 |
| CN | 107574318 B | 8/2019 |

* cited by examiner

METHOD AND APPARATUS FOR SODIUM SLAG RECOVERY

RELATED APPLICATIONS

This application claims the priority of CN Patent Application 202210394618.5, filed Apr. 14, 2022. This application is herein incorporated by reference, in its entirety, for all purposes.

FIELD

The present disclosure relates to the field of metal sodium production and in particular to a method and an apparatus for sodium slag recovery.

BACKGROUND

Metal sodium is a chemically active alkali metal, which has been widely applied in the pharmaceutical, chemical and nuclear industries due to its characteristics such as non-toxicity, desirable electrical and thermal conductivities, low melting point and moderate price. However, given that pure metallic sodium chloride has a melting point up to 801° C., the excessively high electrolysis temperature not only requires the consumption of a large amount of electricity, but also be apt to cause the loss of metal sodium resulting from the volatilization and oxidation, thus the addition of calcium chloride and barium chloride into sodium chloride is required during the practical electrolysis process to form ternary molten salts to lower the electrolysis temperature, such that the electrolysis of metal sodium is carried out at a temperature range of 580-620° C. The addition of calcium chloride and barium chloride, with its positive aspect of significantly lowering the temperature during the electrolysis process, however, as a proverb says, every coin has two sides, the addition of calcium chloride and barium chloride brings about a problem that the cathodic reduction potentials of calcium and sodium ions are close, resulting in the production of metal sodium at the cathode is accompanied with the reduction of a small amount of metal calcium, so that the liquid sodium produced from electrolysis must be refined in a refining tank to remove the metal calcium entrained therein. During the refining process of metal sodium, the density of metal calcium (density $\rho=1.55$ g/cm$^3$) is greater than that of metal sodium (density $\rho=0.968$ g/cm$^3$), such that the metal sodium has a purity of 99.5-99.8% and is obtained at the upper layer, and a sodium slag containing metal sodium and calcium is formed at the bottom. The sodium slag, according to an analysis performed pursuant to the Industry Standard of High Calcium Sodium in China (HG/T5550-2019), comprises 60-90% of the metal sodium component and 10-40% of the metal calcium component. In light of the metal sodium and calcium are very active in carrying out chemical reactions in the air or water, and even cause explosion, the storage and transportation of the sodium slag must comply with the provisions of safety supervision regulations relevant to the railroad, highway, waterway transportation of dangerous goods and the requirements of transportation industry standard JT/T617.1-JT/T617.7 of China concerning the road transportation of hazardous goods. The sodium slag is produced in an amount of 9-12% of the metal sodium production, calculated from the ratio of the feedstock consumption of sodium chloride to calcium chloride and the material balance, which corresponds to approximately 900-1,200 tons of sodium slag produced per year during the production process of 10,000 tons of metal sodium. The solutions concerning how to treat said co-produced sodium slag safely and recover the sodium and calcium resources thereof are of great economic and environmental value.

The existing methods for treating sodium slag are mainly composed of alcoholysis, vacuum distillation and melt pressure filtration process. In the case of sodium slag alcoholysis, for example, CN208562194U reports that the sodium slag and methanol are reacted in a methanol tank to obtain a sodium methoxide product and a resource recovery processing system. This method uses methanol, ethanol or water as a raw material for carrying out reaction with the sodium slag to produce sodium methoxide, sodium ethoxide and sodium hydroxide and other by-products. In the case of sodium slag vacuum distillation, CN103667708B, CN102634671A and CN203668481U report that the sodium slag is heated by vacuum to obtain sodium vapor, and the sodium vapor is then condensed into liquid sodium to obtain sodium ingots. The major problems of this process are that the high energy consumption of the high temperature evaporation process of metal sodium, and the significantly increased recovery cost resulting from that sodium vapor is more flammable and explosive than metal sodium, it imposes higher requirements on high-temperature corrosion and explosion resistance of the equipment. In the case of the sodium slag melt pressure filtration process, CN2846436Y, CN203487209U, CN2846437Y, CN109371250A and CN107574318B report that after melting of the sodium slag at the high temperature, the molten metal sodium and unmelted metal calcium are separated by mechanical compression to obtain a part of metal sodium and a residual sodium slag. The method compresses the metal sodium by the compression method, and in general, the extraction yield of metal sodium is 40-50%, and a considerable part of metal sodium and metal calcium are mixed together and can hardly be separated. In addition, the sodium-calcium mixture by-produced during the compression process is still a hazardous waste. The oxygen and water isolation treatment is required during the storage process. In the case of the sodium slag molten salt displacement recovery process, the China patent application (CN109371250A) discloses a preparation technology for extracting metal sodium from sodium slag with a melting displacement method, the preparation technology comprises the following steps: (1) the sodium slag is placed in a sodium slag melting tank and is heated under protection of nitrogen gas, and molten sodium slag is obtained; (2) the molten sodium slag is added to a reaction kettle, meanwhile, sodium chloride is added for a replacement reaction, the metal sodium, calcium chloride and calcium oxide are formed, and the metal sodium with the purity ranging from 96% to 98% is obtained; (3) then the metal sodium is added to a refining device and subjected to cooling and deposition treatment, the metal sodium with the purity 99.7% is obtained and is transferred to a refined sodium storage tank; residues produced through cooling and deposition in the refining device are added to the sodium slag melting tank and then conveyed to the reaction kettle for the replacement reaction again; (4) the obtained metal sodium with a purity of 99.7% is processed by a sodium casting machine, the preparation technology is close to the existing refined sodium production process. In the case of sodium slag flotation separation process, the recently filed Chinese patent application CN105821217A discloses a method of repeatedly heating and cooling down by using the liquid dispersion medium, in combination with mechanical stirring process, and then separating the metal sodium solids by cooling down to obtain a sodium recovery yield of 80-95% or more in the sodium slag, which significantly increases the recovery efficiency of the sodium slag. The major problems of this process are that the pressure and energy consumption of heating and heat dissipation of equipment are increased by the repeated heating and cooling down treatment, there are safety hazard problems with using a large amount of flammable alcohol ether-based organic solvents.

Through a comprehensive analysis of the various technologies of disposing sodium slag mentioned above, it has been discovered that flammable explosive materials such as alcohol, organic solvent, or high-temperature sodium vapor volatilize are involved in the sodium slag disposing process disclosed by the patent applications, therefore, it is an urgent problem to be solved by the metal sodium industry to develop a process for safe treatment of sodium slag and recovering sodium and calcium resources without using hazardous materials such as organic solvent or sodium vapor.

SUMMARY

The present disclosure aims to solve defects of the prior art and provides a method and an apparatus for sodium slag recovery, the method and apparatus for sodium slag recovery provided by the present disclosure is safe and controllable.

In a first aspect, the present disclosure provides a method for sodium slag recovery, the method comprises the following steps:
  (1) subjecting a liquid sodium slag to a gravity stratification to obtain pure metallic sodium and high calcium content sodium slag;
  (2) roasting said high calcium content sodium slag to obtain a roasting slag;
  (3) leaching said roasting slag by using an alkaline liquor to obtain a sodium hydroxide solution and calcium hydroxide.

Preferably, the roasting in step (2) comprises the following steps:
  (2-1) Subjecting the high calcium content sodium slag to a first roasting to obtain a first roasted product slag;
  (2-2) Pulverizing the first roasted product slag, and then subjecting the first roasted product slag to a second roasting to obtain the roasting slag. A use of the preferred embodiment is more advantageous to maximize conversion of the high calcium content sodium slag to the sodium peroxide, sodium oxide, calcium oxide, and a small amount of residual sodium calcium slag.

Preferably, the solute of the alkaline liquor in step (3) is a hydrate, most preferably sodium hydroxide tetrahydrate. The preferred embodiment allows to reduce of the free water concentration and to moderate the reaction, thereby fulfilling the purpose of the safe production.

In a second aspect, the present disclosure provides an apparatus for sodium slag recovery, the apparatus comprising a stratification unit, a first roasting unit, a pulverizer, a second roasting unit and a reaction kettle connected in series;

Wherein the stratification unit is used for stratification of the sodium slag to obtain pure metallic sodium and high calcium content sodium slag;

The stratification unit is provided with a high calcium content sodium slag outlet, and the high calcium content sodium slag outlet is in communication with an inlet of the first roasting unit;

The reaction kettle is used for leaching the roasting slag obtained from the second roasting unit with the alkali liquor.

The method and apparatus for recovering metal sodium and calcium resources from the sodium slag provided by the present disclosure are safe and controllable without consumption of chemicals, and allow the hazardous waste sodium slag to be secondary developed and converted into sodium hydroxide solution and calcium hydroxide solid, thus realizing high value utilization of the sodium slag.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In the description of the present disclosure, unless otherwise specified, it shall be comprehended that the orientation or positional relationship indicated by the terms "central", "longitudinal", "lateral", "length", "width", "thickness", "upper", "lower", "left", "right", "vertical", "horizontal", "top", "bottom", "axial", "radial", "circumferential" and the like refer to the orientation or positional relationship illustrated based on the appended drawings, the terms are merely used for convenience in describing the present disclosure and simplifying the description, instead of indicating or implying that the apparatus or components thereof must be disposed with a specific orientation, constructed and operated with a particular orientation, thus the terms shall not be considered as imposing a limitation to the present disclosure. Furthermore, the terms "inside" and "outside" refer to the inside and outside relative to the profiles of the respective element per se.

Unless otherwise specified in the present disclosure, the terms associated with connection, such as "connected" and "interconnected", refer to a relationship of fixed or connected with each other of the structures, either directly or indirectly through an intermediate structure, as well as the relationship of movable or rigid connection.

As used herein, when an element or a component or a unit is referred to as being "connected to", "coupled with" or "contacting" another element or component or unit, the element or component or unit may be directly connected to, directly coupled with or directly contacting a particular element or component or unit, or connected to, coupled with or contacting a particular element or component or unit through one or more intermediate elements or components or units. When an element is referred to as being "directly connected", "directly coupled", or "directly contacting" another element, there is not any intermediate element or component or unit therebetween.

The term "fluidly coupled to" or "fluidly coupled" used herein shall be understood as a component connected to a pipe or pipeline and configured to allow a gas or liquid to flow through the component.

The term "ambient temperature" described herein shall be comprehended as a temperature under ambient conditions, e.g. room temperature of 20-25° C.

The expressions "first" and "second" described herein merely serve to distinguish between the materials that are used or the operations that are implemented in the different steps or stages, are not intended to impose limitation to the particular material or operation.

In the present disclosure, where the values are expressed as approximations by using an antecedent "about", it shall be understood that the particular values form another embodiment. As used herein, "about X" (wherein X is a numerical value) preferably means a range of ±10% around the cited value, including the endpoints. For example, the phrase "about 8" preferably refers to a value within the range of 7.2-8.8, inclusive of the endpoints 7.2 and 8.8. When the antecedent "about" is present, all ranges are inclusive and combinable. For example, when a range of "1 to 5" is listed, the cited range should be interpreted to include the ranges "1 to 4", "1 to 3", "1-2 and 4-5", "1-3 and 5", "2-5", etc. Furthermore, when a list of alternatives is provided, the list may be interpreted to mean that any of the alternatives can be excluded, e.g., by a negative limitation in the claims. For example, when a range of "1 to 5" is recited, the recited range may be interpreted to include instances where any of 1, 2, 3, 4, or 5 is negatively excluded; thus a recitation of "1 to 5" may be interpreted to include "1 and 3-5, but not 2", or be simply construed as "wherein 2 is excluded". It means that any component, element, attribute, or step expressly recited herein may be excluded from the claims, regardless of the components, elements, attributes, or steps are listed as alternatives or they are individually cited.

The term "substantially" or "substantially the same" used herein, unless otherwise specified, shall be understood to encompass a parameter having a fluctuation within a suitable range, e.g., ±10% or ±15% fluctuation of the parameter. In some embodiments, the fluctuation range is within ±10%.

Unless expressly stated otherwise, the terms "optionally" or "selectively" used herein mean that the action may be performed or not performed, or that the material is added or not added.

In the present disclosure, when a gas concentration is concerned, such as "oxygen concentration", it refers to the volume concentration of the gas unless otherwise specified.

Figure 1:
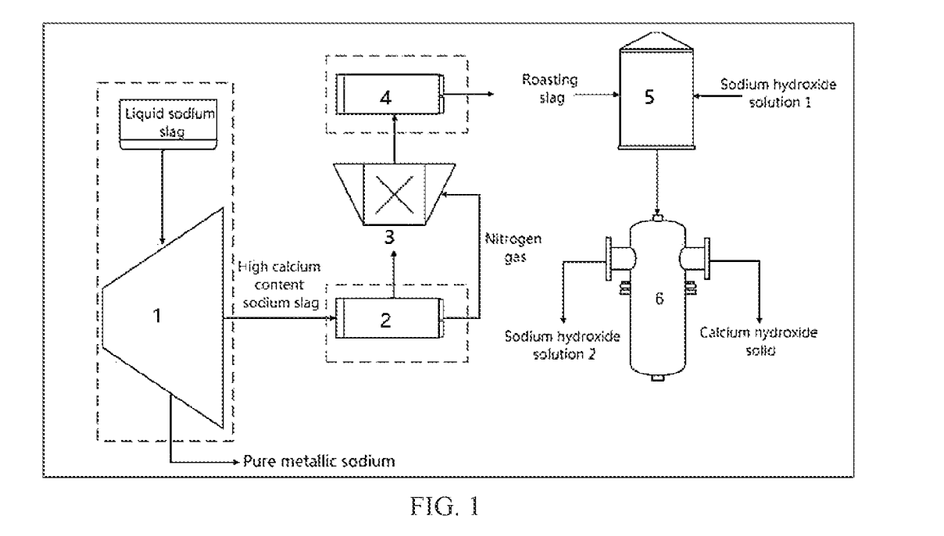
FIG. 1 is a schematic view of a recovery apparatus in a specific embodiment provided by the present disclosure.

In a first aspect, the present disclosure provides a method for sodium slag recovery, as shown in FIG. 1, the method comprises the following steps:
(1) Subjecting a liquid sodium slag to a gravity stratification to obtain pure metallic sodium and high calcium content sodium slag;
(2) Roasting said high calcium content sodium slag to obtain a roasting slag;
(3) Leaching said roasting slag by using an alkaline liquor to obtain a sodium hydroxide solution and calcium hydroxide.

The method provided by the present disclosure is suitable for the recovery of most industrial sodium slags, such as directly obtained industrial sodium slags, preferably the hazardous waste sodium slags generated from the process of preparing metal sodium from electrolysis of sodium chloride, or the sodium slags treated by the prior art.

According to a preferred embodiment of the present disclosure, the sodium slag comprises Na and Ca; preferably, Na is contained in an amount of 60-90 wt % and Ca is contained in an amount of 10-40 wt %, based on the total amount of said sodium slag. In addition to Na and Ca, the sodium slag in the method provided by the present disclosure does not exclude other metal elements including, but not limited to, barium, magnesium and potassium, contained in the small amounts (e.g., not more than 2%). Moreover, the present disclosure does not impose particular limitation to the forms of Na and Ca present in the sodium slag, the various forms of the sodium slag containing Na and Ca are suitable for the recovery method provided in the present disclosure.

The present disclosure is not particularly limited to the phase state of the sodium slag, which may be a liquid state or a solid state. As will be understood by those skilled in the art, the stratification may be directly performed when the sodium slag is in the liquid state; when the sodium slag is in the solid state, the stratification may be performed after melting the sodium slag.

The present disclosure has a wide selection range with respect to the melting conditions, only if the melting conditions can meet the requirements of smoothly performing the subsequent stratification process. Preferably, the melting conditions comprise: a heating temperature of 98-320° C., preferably 110-210° C., such as 110° C., 130° C., 150° C., 170° C., 190° C., 210° C., or an arbitrary value between any two thereof a heating time of 5-120 minutes, preferably 10-60 minutes, such as 5, 10, 15, 20, 30, 50, 60 minutes; the melting is preferably carried out under an inert or reducing atmosphere, more preferably under an inert atmosphere; the inert atmosphere is preferably provided by at least one of nitrogen gas, helium gas, neon gas and argon gas.

The present disclosure is not particularly limited to the specific form of gravity stratification. Preferably, the gravity stratification comprises sedimentation and/or supergravity centrifugation, more preferably supergravity centrifugation. Preferably, the gravity stratification of the present disclosure is supergravity centrifugation. When such a preferred embodiment is adopted, it can produce desirable separation effect and high separation efficiency.

In order to favorably achieve the supergravity separation effect of the present disclosure, the inventors of the present disclosure have discovered during the research process that the selection of an appropriate centrifugation separation factor is more advantageous for obtaining pure metallic sodium and high calcium content sodium slag; preferably, a separation factor Fr of said supergravity centrifugation in step (1) is within a range of 100-8,500, preferably 500-5,500, more preferably 1,500-4,500.

According to the present disclosure, the stratification may be carried out under the action of the supergravity; the time for said supergravity centrifugation is preferably within a range of 1-500 min, more preferably 2-20 min, such as 2 min, 5 min, 10 min, 15 min, 20 min, or an arbitrary value between any two thereof.

When there is a small amount of sodium slag to be treated, the process of roasting the sodium slag may be completed for once. Preferably, the roasting temperature of step (2) is controlled to be within a range of 220-750° C., more preferably 240-450° C.

Preferably, the roasting is a controllable oxygen roasting, which is carried out under the controlled oxygen gas supply conditions. The oxygen gas supply comprises, unless otherwise specified, a combined control of oxygen gas concentration and/or oxygen gas flow rate. The present disclosure proposes to safely provide a controllable roasting of sodium slag, by using the hourly oxygen gas flow per ton of sodium slag (i.e., $m^3$/t·min) as the measuring unit so as to accurately measure and control the roasting speed of oxygen gas and heat dissipation speed during the roasting process. Experiments have shown that the measuring unit is a complex unit, its further and effective combination with oxygen concentration can fulfill the purpose of controllable roasting. Preferably, the flow rate of the oxygen component during the controllable roasting process is within a range of 0.50-10 m$^3$/t·min, more preferably 1-6 m$^3$/t·min.

According to a preferred embodiment of the present disclosure, the oxygen concentration during the roasting process is within a range of 5-40%, preferably 10-30%.

Preferably, the roasting is carried out for 5-180 min, preferably 10-90 min, such as 10 min, 20 min, 30 min, 40 min, 50 min, 60 min, 70 min, 80 min, 90 min, or an arbitrary value between any two thereof.

According to a preferred embodiment of the present disclosure, the roasting in step (2) comprises the following steps:

(2-1) Subjecting the high calcium content sodium slag to a first roasting to obtain a first roasted product slag;

(2-2) Pulverizing the first roasted product slag, and then subjecting the first roasted product slag to a second roasting to obtain the roasting slag. The present inventors have found during the course of researches that when a large amount of the sodium slag is treated, for example, a batch treatment amount of said sodium slag is larger than 0.5 kg, the primary roasting slag (the first roasting product) is often entrained with a small amount of residual metal sodium and calcium, the metal sodium and calcium components in the residual slag react directly with water during the leaching process, and a small amount of hydrogen gas is generated as a byproduct, which increases the risk of the disposal process. In order to improve the safety of the roasting slag during the leaching process, the present disclosure preferably subjects the primary roasting slag to a primary pulverization and a secondary roasting, and to a further leaching process, thereby significantly improve safety of the leaching process of the roasting slag. The purpose of the present disclosure using either the one-step roasting process or the two-step roasting process is to secure the controllable oxidation process and safe production of the sodium slag, such that most of the sodium and calcium are converted to oxides, which improves leaching efficiency of alkali liquor and recovery rate of the sodium and calcium resources.

According to the present disclosure, the conditions of the first roasting are not particularly limited, only if the first roasting is performed on the high calcium content sodium slag to obtain a first roasted product containing sodium peroxide, sodium oxide, calcium oxide and a small amount of residual sodium calcium slag, under the premise of safe production.

According to a preferred embodiment of the present disclosure, the first roasting in step (2-1) is carried out for 5-180 min, preferably 10-90 min, such as 10 min, 20 min, 30 min, 40 min, 50 min, 60 min, 70 min, 80 min, 90 min, or an arbitrary value between any two thereof.

According to a preferred embodiment of the present disclosure, the temperature of said first roasting in step (2-1) is within a range of 200-720° C., preferably 220-450° C., such as 220° C., 250° C., 300° C., 350° C., 400° C., 420° C., 450° C., or an arbitrary value between any two thereof.

According to a preferred embodiment of the present disclosure, the temperature of said second roasting in step (2-2) is within a range of 230-800° C., preferably 260-600° C., such as 260° C., 300° C., 350° C., 400° C., 450° C., 500° C., 550° C., 600° C., or an arbitrary value between any two thereof.

According to a preferred embodiment of the present disclosure, the second roasting in step (2-2) is carried out for 10-240 min, preferably 10-60 min, such as 10 min, 20 min, 30 min, 40 min, 50 min, 60 min, or an arbitrary value between any two thereof.

In accordance with a preferred embodiment of the present disclosure, the first roasting in step (2-1) and the second roasting in step (2-2) are each independently a controllable oxygen roasting; the controllable oxygen roasting causes conversion of the high calcium content sodium slag into sodium peroxide, sodium oxide, calcium oxide and residual sodium calcium slag under the condition of satisfying the safe operation. The controlled oxygen roasting in the present disclosure means that the supply amount and concentration of oxygen gas are controllable through various means, and the conditions are controlled so as to meet safe operation and allow maximum conversion of the high calcium content sodium slag to sodium peroxide, sodium oxide, calcium oxide and residual sodium calcium slag.

Preferably, the oxygen flow rate of said first roasting in step (2-1) is within a range of 0.5-10 m$^3$/t·min, more preferably 1-6 m$^3$/t·min, in terms of per ton of high calcium content sodium slag, such as 1 m$^3$/t·min, 2 m$^3$/t·min, 3 m$^3$/t·min, 4 m$^3$/t·min, 5 m$^3$/t·min, 6 m$^3$/t·min, or an arbitrary value between any two thereof.

Preferably, the oxygen flow rate in the second roasting process of step (2-2) is within a range of 1-20 m$^3$/t·min, preferably 1-10 m$^3$/t·min, in terms of per ton of first roasted product slag, such as 1 m$^3$/t·min, 2 m$^3$/t·min, 3 m$^3$/t·min, 4 m$^3$/t·min, 5 m$^3$/t·min, 6 m$^3$/t·min, 7 m$^3$/t·min, 8 m$^3$/t·min, 9 m$^3$/t·min, 10 m$^3$/t·min, or an arbitrary value between any two thereof. The oxygen concentration refers to the content of oxygen component in air or an oxygen deficient air. The new measuring unit facilitates a scientific control of the thermal balance and the roasting speed during the roasting process of sodium slag.

According to a preferred embodiment of the present disclosure, the oxygen concentration of said first roasting in step (2-1) is within a range of 5-30%, preferably 10-25%.

According to a preferred embodiment of the present disclosure, the oxygen concentration during said second roasting in step (2-2) is within a range of 10-60%, more preferably 15-40%.

In the present disclosure, pulverization of the first roasted product in step (2-2) can obtain roasting slag having uniform particle size, which improves safety of the leaching process of roasting slag. The present disclosure is not particularly limited to the pulverization mode, for example, it can be a mechanical pulverization.

Preferably, the pulverizing in step (2-2) is performed to obtain a pulverized slag with a granularity of 10-160 mesh, preferably 20-80 mesh, more preferably 20-60 mesh.

The specific rotation speed, time and number of pulverization are not particularly limited in the present disclosure, as long as the pulverized slag with the above granularity can be obtained.

Preferably, the method further comprises recovering the tail gas of step (2-1), and providing the recovered tail gas (abbreviated as first roasting tail gas) with or without supplemental air or oxygen gas (depending on the oxidation state) to the pulverization process of step (2-2), or providing the second roasting of step (2-2) with a second roasting atmosphere. The tail gas obtained from the first roasting process is mainly consisting of nitrogen gas, which is collected and cooled and can be used as a protective gas used in subsequent pulverization processes or be used for diluting the concentration of oxygen gas in air, such an arrangement not only ensures safe operation of the roasting process, but also reduces cost.

Preferably, the pulverizing is performed under a protective atmosphere provided by at least one of a first roasting tail gas, nitrogen gas, helium gas, argon gas and neon gas. In order to reduce the cost of using the protective atmosphere during the pulverization process, it is preferable to select the first roasting tail gas for providing the protective atmosphere.

The present disclosure has discovered by roasting, particularly after two roasting processes (first roasting and second roasting), that the majority of the sodium and calcium components of the sodium slag have been converted to sodium oxide and calcium oxide. Analysis of the hydration process of sodium oxide or calcium oxide has revealed that the hydration reactions are performed rapidly and accompanied with the generation of a large amount of heat, and in severe cases, cause splashing of an alkali liquor and bumping phenomenon, which increases the difficulty and safety hazard of the treatment process. The inventors have discovered through extensive researches that the hydration process of sodium oxide or calcium oxide depends on the amount of free water in the solution and the contact temperature. For example, since there are sodium hydroxide dihydrate and sodium hydroxide tetrahydrate in an aqueous solution of sodium hydroxide, the presence of these hydration actions greatly reduces the amount of free water in the solution, thus it is preferable in the present disclosure to hydrate the second roasting slag of the sodium slag with a hydrate, thereby safely leach the secondary roasting slag. Preferably, a solute of the alkaline liquor in step (3) is a hydrate, preferably a sodium hydroxide hydrate and/or a calcium hydroxide hydrate, most preferably a sodium hydroxide hydrate, such as sodium hydroxide tetrahydrate and sodium hydroxide dihydrate.

According to a preferred embodiment of the present disclosure, the concentration of said alkaline liquor is within a range of 20-100 wt %, preferably within a range of 30-100 wt %, based on the hydroxide hydrate. For example, when the solute of the alkali liquor is sodium hydroxide tetrahydrate, the concentration of the alkali liquor in terms of NaOH is within a range of 11-36 wt %. If a hydrate having a high concentration is used for hydrating the secondary roasting slag of the sodium slag, the secondary roasting slag can be safely leached, so as to convert it into a sodium hydroxide solution and calcium hydroxide mixture.

Preferably, a reaction temperature of the leaching is within a range of −18° C. to 45° C., further preferably −15° C. to 30° C., more preferably −15° C. to 10° C. An use of the preferred embodiment is more conducive to improving safety of the leaching process of roasting slag.

Preferably, a reaction time of the leaching is within a range of 10-300 min, more preferably 15-60 min, such as 15 min, 20 min, 30 min, 40 min, 50 min, 60 min, or an arbitrary value between any two thereof.

According to the present disclosure, it is preferred that the method further comprises subjecting the mixed material obtained from the leaching process to a solid-liquid separation to obtain a liquid (sodium hydroxide solution) and a solid (calcium hydroxide). More preferably, the method further comprises recycling at least part of said liquid to the leaching process for providing at least part of the alkaline liquor. In particular, a part of the concentrated sodium hydroxide solution therein may be used as a by-product, another part of the sodium hydroxide is supplemented with water content to convert into sodium hydroxide tetrahydrate and/or sodium hydroxide dihydrate, which is reused in the hydration process of the next batch of the secondary roasting slag.

In a second aspect, the present disclosure provides an apparatus for sodium slag recovery, the apparatus comprising a stratification unit 1, a first roasting unit 2, a pulverizer 3, a second roasting unit 4 and a reaction kettle 5 connected in series;

Wherein the stratification unit 1 is used for stratification of the sodium slag to obtain pure metallic sodium and high calcium content sodium slag;

The stratification unit 1 is provided with a high calcium content sodium slag outlet, and the high calcium content sodium slag outlet is in communication with an inlet of the first roasting unit 2;

The reaction kettle 5 is used for leaching the roasting slag obtained from the second roasting unit with the alkali liquor.

According to said apparatus of the present disclosure, it is preferable that the stratification unit 1 is provided with a liquid sodium slag inlet, a pure metallic sodium outlet and a high calcium content sodium slag outlet. The sodium slag is layered in the stratification unit 1 to obtain pure metallic sodium and high calcium content sodium slag, which are output from the pure metallic sodium outlet and the high calcium content sodium slag outlet, respectively.

As mentioned above, whether the melting of the sodium slag is required or not can be determined based on the phase state of the sodium slag, and if necessary, it is preferable that the apparatus further comprises a melting means for melting the sodium slag, an outlet of said melting means is in communication with an inlet of the stratification unit 1.

According to a preferred embodiment of the present disclosure, the stratification unit 1 comprises a precipitator and/or a supergravity centrifuge, preferably a supergravity centrifuge. Both the precipitator and the supergravity centrifuge may be various types of equipment conventionally used in the art. The precipitator may serve to perform a resting stratification of the sodium slag, and the supergravity centrifuge may be used for supergravity centrifugation stratification of the sodium slag.

According to a specific embodiment of the present disclosure, an inlet of the supergravity centrifuge is in communication with a liquid sodium slag supply unit.

Preferably, the high calcium content sodium slag outlet of the stratification unit is in communication with an inlet of the first roasting unit. In this way, the stratified high calcium content sodium slag is subjected to a first roasting in the first roasting unit. The present disclosure is not particularly limited to the equipment of the first roasting unit, the first roasting unit 2 preferably comprises a first roasting furnace, more preferably a tube furnace or a rotary kiln, for performing the first roasting.

Preferably, the first roasting furnace is equipped with a first flowmeter and a first oxygen concentration meter for controlling an oxygen supply amount of the first roasting furnace. The present disclosure does not impose particular limitation on the specific arrangement mode of the first flow meter and the first oxygen concentration meter, as described above, the two detection components serve to perform controllable oxygen roasting in the first roasting unit, thus the first flow meter and the first oxygen concentration meter are arranged so long as the controllable oxygen roasting in the first roasting unit can be performed; in particular, both an inlet and an outlet of the first rotary kiln are provided with a flow meter and an oxygen concentration meter.

Preferably, the pulverizer 3 is provided with a protective gas pipeline for supplying protective gas to said pulverizer 3 to provide a protective atmosphere for pulverizing in the pulverizer 3. The kinds of said protective atmosphere are as mentioned above, the content will not be repeated here.

Preferably, the second roasting unit 4 comprises a second roasting furnace, more preferably a tube furnace or a rotary kiln, for performing the second roasting; preferably the second roasting furnace is equipped with a second flowmeter and a second oxygen concentration meter for controlling the oxygen supply amount of the second roasting furnace. The arrangement mode and consideration of the second flowmeter and the second oxygen concentration meter are as explained above, the content is not repeated herein.

Preferably, the reaction kettle 5 is provided with an alkali liquid inlet.

Preferably, the apparatus further comprises a solid-liquid separation device 6 connected in series with the reaction kettle 5, the solid-liquid separation device 6 is used for subjecting the material obtained from the leaching of the reaction kettle 5 to a solid-liquid separation to obtain a solid and a liquid. An outlet of the reaction kettle 5 is in communication with an inlet of the solid-liquid separation device 6. In particular, the solid-liquid separation device is provided with a liquid outlet and a solid outlet.

Preferably, a liquid outlet of said solid-liquid separation device 6 is in communication with an inlet of said reaction kettle 5. With such a preferred embodiment, the recovered liquid may be recycled to the leaching process for providing at least a part of the alkali liquid. The remaining part of the liquid may be regarded as a by-product, and the solid is used as a by-product.

According to a preferred embodiment of the present disclosure, the gas outlet of the first roasting unit is in communication with the gas inlet of the pulverizer and/or the second roasting unit. An use of the preferred embodiment can recover the tail gas generated from the first roasting process, and the recovered tail gas is supplemented with air or oxygen gas (depending on the oxidation state) to provide a protective atmosphere for the pulverizing process or a second roasting atmosphere.

The method and apparatus of the present disclosure can allow a secondary development of a hazardous waste sodium slag generated from the electrolysis of sodium chloride for preparing metal sodium, thereby realizing high value utilization of the sodium slag.

The present disclosure will be described in detail below with reference to examples.

Example 1

(1) 1 kg of liquid sodium slag at 190° C. (composed of 85 wt % metal sodium, 14 wt % metal calcium, balance 1 wt % sodium oxide and calcium oxide generated from surface oxidation) was placed in a supergravity centrifuge under the heat preservation condition, and subjected to centrifuging at a separation factor of 3,200 for 3 min to obtain 497 g of high purity sodium and 502 g of high calcium content sodium slag. The high purity sodium had a purity of 99.93 wt %, the high calcium content sodium slag contained 71 wt % metal sodium, 28 wt % metal calcium, and 1 wt % sodium oxide and calcium oxide generated from surface oxidation, as analyzed according to the industry standard HG/T5550-2019 in China.

(2) 502 g stratified high-calcium sodium slag was subjected to an oxygen controllable roasting in a first tube furnace having a diameter of 60 mm (equipped with a flow meter for detecting oxygen gas flow rate at an inlet, and equipped with an oxygen densitometer at the inlet and outlet), the oxygen concentration was controlled to be 15%, the flow rate of the oxygen component was set to 6 L/kg·min, the oxidation temperature range was controlled to be 420-450° C., and the oxidation time was 80 min, such that the sodium peroxide, sodium oxide, calcium oxide and residual sodium calcium slag were obtained; after performing the separation and titration analysis, the amount of the residual non-oxidized sodium calcium slag was about 5 wt %.

Figure 2:
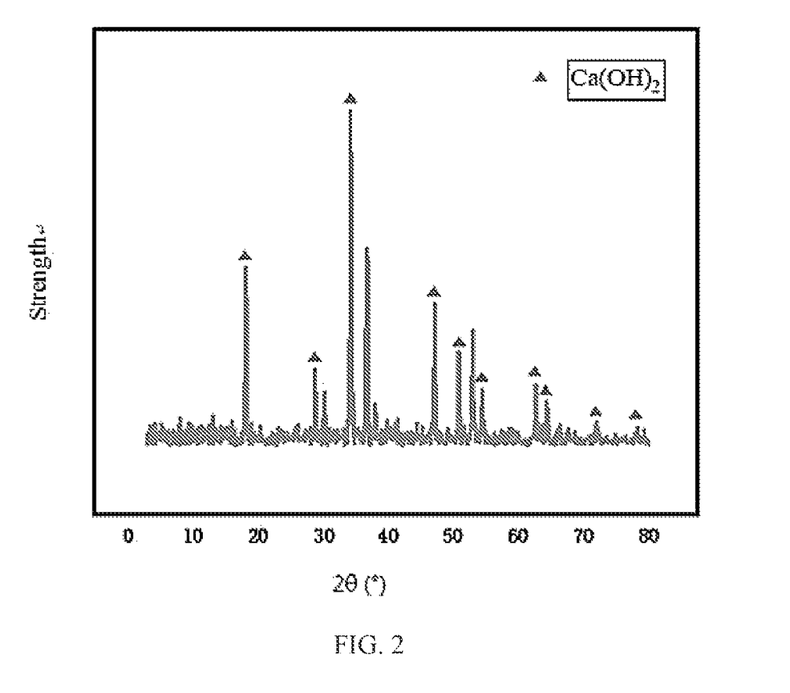
FIG. 2 illustrates an X-Ray Diffraction (XRD) pattern of calcium hydroxide recovered in Example 1 of the present disclosure.

(3) The roasting product of step (2) was subjected to directional leaching (at a temperature of 5° C. for 15 minutes) in the reaction kettle by using 17.5 liters of sodium hydroxide tetrahydrate solution (equivalent to a mass percentage concentration by weight of NaOH about 35.7%), and subjected to separation in a solid-liquid separation apparatus to obtain concentrated sodium hydroxide solution and calcium hydroxide solid; the concentrated sodium hydroxide solution was then diluted by adding 2 liters of deionized water to produce about 19 liters of sodium hydroxide tetrahydrate solution, wherein 17.5 liters of sodium hydroxide solution was spared for an use in the next batch, 1.5 liters of the remaining sodium hydroxide solution was the newly added sodium hydroxide product. The filter residue was washed and dried to obtain about 257 grams of calcium hydroxide. FIG. 2 illustrated an XRD pattern of the calcium hydroxide solid.

Example 2

(1) 1,000 g of the same sodium slag as in Example 1 was taken, initially heated to 200° C. and then placed in a heat insulated tetrafluoro centrifuge cup and subjected to a supergravity separation in a centrifuge for 5 min, a separation factor was controlled to be 3,500, so as to obtain 590 g of pure metallic sodium (99.1% purity) and 405 g of high calcium content sodium slag (composed of 64 wt % sodium, 35 wt % calcium, and 1 wt % oxide).

(2) The separated high calcium content sodium slag was subjected to controllable oxygen roasting in a first tube furnace (equipped with the same components as Example 1) at a controlled oxygen concentration of 21%, an oxygen flow rate of 1.8 L/kg·min, an oxidation temperature range of 430-500° C. and an oxidation time of 85 min, so as to obtain a mixture consisting of a pale yellow sodium peroxide, white sodium oxide, calcium oxide and residual unroasted sodium calcium slag entrained therein. The amount of residual unroasted sodium calcium slag was about 6 wt % after performing a titration analysis. The tail gas discharged from the tube furnace was collected and used as a protective gas during the pulverizing process.

(3) The roasting slag of step (2) was subjected to a ball-milling pulverization through a planetary ball mill, the rotation speed of pulverization was 120 rpm, the milling time was 30 min, and the protective gas of said ball mill was a roasting tail gas. The pulverized slag was sieved to obtain a roasting slag with a granularity of 60 mesh; the roasting slag was then subjected to secondary roasting in a second tube furnace (equipped with the same components as those in the first tube furnace), the roasting temperature was controlled to be 460° C., the roasting time was 15 min, the roasting atmosphere was an oxygen deficient atmosphere with an oxygen concentration of 15%, and the oxygen gas flow rate was 2.4 L/kg·min in terms of the first roasted product slag, such that approximately 540 g of a mixture of sodium oxide, calcium oxide was obtained.

(4) The roasting product of step (3) was subjected to directional leaching (at a temperature of 10° C. for 20 minutes) in the reaction kettle by using 8 liters of sodium hydroxide tetrahydrate solution (equivalent to a mass percentage concentration by weight of NaOH about 35%), and subjected to separation in a solid-liquid separation apparatus to obtain concentrated sodium hydroxide solution and calcium hydroxide solid; the concentrated sodium hydroxide solution was then diluted by adding 0.8 liters of deionized water to regenerate about 8.8 liters of sodium hydroxide tetrahydrate solution, wherein 8 liters of sodium hydroxide solution was spared for an use in the next batch, 0.8 liters of the remaining sodium hydroxide solution was the newly added sodium hydroxide product. The filter residue was dried to obtain about 260 grams of calcium hydroxide.

Example 3

(1) 10 kg of the sodium slag from the Inner Mongolia Ruixin Chemical Company at a temperature of 170° C. (composed of 86 wt % metal sodium, 14 wt % metal calcium) was placed in a supergravity centrifuge and subjected to the supergravity centrifugation for 3 min, the separation factor was set to 4,200 to obtain 6.2 kg of pure metallic sodium (with a sodium content of 99.75 wt %) and 3.75 kg of high calcium content sodium slag (containing 63 wt % of sodium and 37 wt % of calcium).

(2) The high calcium content sodium slag was subjected to a controllable oxygen roasting in a first rotary kiln (equipped with the same components as Example 1) under an air atmosphere at a roasting temperature of 350-400° C. for a roasting time of 60 min, the oxygen flow rate was controlled to be 4.1 L/kg·min, such that the sodium peroxide, sodium oxide, calcium oxide and residual sodium calcium slag were obtained; after performing the separation and titration analysis, the amount of the residual non-oxidized sodium calcium slag was about 17 wt %.

(3) The roasting slag of step (2) was subjected to two pulverization processes by a mechanical pulverizer at a pulverization speed of 10,000 rpm and a pulverization time of 3 s+3 s, the pulverizer atmosphere was protective nitrogen gas, a roasting slag having a granularity of 40 mesh was obtained by sieving; the roasting slag was then subjected to a second roasting in a second rotary kiln (equipped with the same components as the first rotary kiln) at a controlled roasting temperature of 400° C., a roasting time of 15 min, an oxygen concentration of 20%, and an oxygen gas flow rate of 2.2 L/kg·Min, to obtain about 5.03 kg of a mixture containing sodium oxide and calcium oxide;

(4) The roasting product of step (3) was subjected to directional leaching (at a temperature of 5° C. for 30 minutes) in the reaction kettle by using 30 liters of sodium hydroxide tetrahydrate solution (equivalent to a mass percentage concentration by weight of NaOH about 30%), and subjected to separation in a solid-liquid separation apparatus to obtain concentrated sodium hydroxide solution and calcium hydroxide solid; the concentrated sodium hydroxide solution was then diluted by adding 14 liters of deionized water to produce about 43 liters of sodium hydroxide tetrahydrate solution with a concentration of 30 wt %, wherein 30 liters of sodium hydroxide solution was spared for an use in the next batch, 13 liters of the remaining sodium hydroxide solution was the newly added sodium hydroxide product. The filter residue was dried to obtain about 2.6 kg of calcium hydroxide.

Example 4

(1) 200 g of the same sodium slag as in Example 3 was taken and placed in a supergravity centrifuge under the heat preservation of 180° C., and subjected to a supergravity centrifugation for 2 min at a separation factor set at 2,800, so as to obtain 110 g of metal sodium (with a Na content of 99.10 wt %) and 90 g of high calcium content sodium slag (containing Na in an amount of 61 wt % and Ca in an amount of 39 wt %).

(2) The high calcium content sodium slag was subjected to controllable oxygen roasting in a first tube furnace (equipped with the same components as Example 1) at an oxygen gas deficient atmosphere (with an oxygen concentration of 10%), by controlling an oxygen flow rate of 1.3 L/kg·min, an oxidation temperature within a range of 400-420° C. and a roasting time of 60 min, so as to obtain sodium peroxide, sodium oxide, calcium oxide and residual sodium calcium slag. The amount of residual unoxidized sodium calcium slag was about 15 wt % after performing the separation and titration analysis.

(3) The roasting slag of step (2) was subjected to two pulverization processes by a pulverizer at a pulverization speed of 10,000 rpm and a pulverization time of 3 s+3s, the pulverizer atmosphere was protective nitrogen gas, a roasting slag having a granularity of 40 mesh was obtained by sieving; the roasting slag was then subjected to a second roasting in a second tube furnace (equipped with the same components as the first tube furnace) at a controlled roasting temperature of 350° C., a roasting time of 15 min, an oxygen concentration of 21%, and an oxygen gas flow rate of 3 L/kg·Min in terms of the first roasted product slag, to obtain about 122 g of a mixture containing sodium oxide and calcium oxide;

(4) The roasting product of step (3) was subjected to directional leaching (at a temperature of 8° C. for 20 minutes) in the reaction kettle by using 200 mL of sodium hydroxide tetrahydrate solution (equivalent to a mass percentage concentration by weight of NaOH about 35%), and subjected to separation in a solid-liquid separation apparatus to obtain concentrated sodium hydroxide solution and calcium hydroxide solid; the concentrated sodium hydroxide solution was then diluted by adding 190 mL of deionized water to regenerate about 370 mL of sodium hydroxide tetrahydrate solution with a concentration of 35 wt %, wherein 200 mL of sodium hydroxide solution was spared for an use in the next batch, 170 mL of the remaining sodium hydroxide solution was the newly added sodium hydroxide product. The filter residue was dried to obtain about 64 g of calcium hydroxide.

Example 5

(1) 210 g of the same solid sodium slag as in Example 3 at a temperature of 150° C. was placed in a warm centrifuge cup, and subjected to a centrifugation in a supergravity centrifuge for 3 min at a separation factor set at 3,500, so as to obtain 117 g of pure metallic sodium and 93 g of high calcium content sodium slag. The high purity sodium had a purity of 99.70 wt %, the high calcium content sodium slag contained 59 wt % of metal sodium and 41 wt % of metal calcium, as analyzed according to the industry standard HG/T5550-2019 in China.

(2) The high calcium content sodium slag was subjected to controllable oxygen roasting in a first tube furnace (equipped with the same components as Example 1) at an oxygen deficient air atmosphere (with an oxygen concentration of 15%) at a roasting temperature of 450° C. for a roasting time of 55 min, and the oxygen flow rate controlled to be 3 L/kg·min, such that the sodium peroxide, sodium oxide, calcium oxide and residual sodium calcium slag were obtained; after performing the separation and titration analysis, the amount of the residual non-oxidized sodium calcium slag was about 10 wt %.

(3) the roasting slag of step (2) was subjected to two pulverization processes by a pulverizer at a pulverization speed of 10,000 rpm and a pulverization time of 3 s+3s, the pulverizer atmosphere was protective nitrogen gas, a roasting slag having a granularity of 40 mesh was obtained by sieving; the roasting slag was then subjected to a second roasting in a second tube furnace (equipped with the same components as the first tube furnace) at a controlled roasting temperature of 600° C., a roasting time of 10 min, an oxygen concentration of 20%, and an oxygen gas flow rate of 3 L/kg·Min in terms of the first roasted product slag, to obtain about 126 g of a mixture containing sodium oxide and calcium oxide;

(4) The roasting product of step (3) was subjected to directional leaching (at a temperature of −5° C. for 30 minutes) in the reaction kettle by using 300 mL of sodium hydroxide tetrahydrate solution (equivalent to a mass percentage concentration by weight of NaOH about 30%), and subjected to separation in a solid-liquid separation apparatus to obtain concentrated sodium hydroxide solution and calcium hydroxide solid; the concentrated sodium hydroxide solution was then diluted by adding 250 mL of deionized water to regenerate about 530 mL of sodium hydroxide tetrahydrate solution with a concentration of 30 wt %, wherein 300 mL of sodium hydroxide solution was spared for an use in the next batch, 230 mL of the remaining sodium hydroxide solution was the newly added sodium hydroxide product. The filter residue was dried to obtain about 70 g of calcium hydroxide.

Example 6

(1) 200 g of the same sodium slag as in Example 1 was taken and placed in a supergravity centrifuge under the heat preservation of 140° C., and subjected to a supergravity centrifugation for 5 min at a separation factor controlled at 4,200, so as to obtain 118 g of metal sodium (with a purity of 99.93%) and 82 g of high calcium content sodium slag (containing Na in an amount of 58 wt % and Ca in an amount of 42 wt %).

(2) The high calcium content sodium slag after stratification was placed in a tube furnace (equipped with the same components as Example 1), and supplied with oxygen gas for 30 min by controlling an oxygen concentration of 30% and an oxygen flow rate of 1 L/kg·min, the oxygen flow rate was then increased to 3 L/kg·min and the oxygen gas was continuously supplied for 30 min, the accumulative single roasting time was 60 min, so as to obtain 108 g of sodium peroxide, sodium oxide, calcium oxide and residual sodium calcium slag. The amount of residual unoxidized sodium calcium slag was about 3 wt % after performing the titration analysis.

(3) The roasting product of step (2) was subjected to directional leaching by using 300 mL of sodium hydroxide tetrahydrate solution (equivalent to a mass percentage concentration by weight of NaOH about 32%) at a temperature of −5° C. for a leaching time of 10 min, and subjected to a solid-liquid separation to obtain concentrated sodium hydroxide solution and calcium hydroxide solid; the concentrated sodium hydroxide solution was then diluted by adding 240 mL of deionized water to regenerate about 510 mL of sodium hydroxide tetrahydrate solution with a concentration of 32 wt %, wherein 300 mL of sodium hydroxide solution was spared for an use in the next batch, 210 mL of the remaining sodium hydroxide solution was the newly added sodium hydroxide product. The filter residue was dried to obtain about 62 g of calcium hydroxide.

Example 7

(1) 200 g of the same sodium slag as in Example 1 at a temperature of 180° C. was placed in a centrifuge (model No. TDL-5), and was subjected to centrifugation at a separation factor of 3,500 for 2 min to obtain 105 g of sodium metal and 91 g of high calcium content sodium slag. The analysis results indicated that the sodium metal purity was 99.5%, the purity of metal sodium in the high calcium slag was 68 wt %, the purity of the metal calcium was 32 wt %, and the balance was 4 g of sodium oxide and calcium oxide slag generated from the oxidation process.

(2) The high calcium content sodium slag after stratification was placed in a tube furnace, and introduced with an atmosphere consisting of air and nitrogen gas (in a volumetric ratio of 1:1), the roasting temperature was controlled to be 440° C., and supplied with oxygen gas for 70 min at an oxygen flow rate of 2 L/kg·min, so as to obtain about 129 g of sodium peroxide, sodium oxide, calcium oxide and residual sodium calcium slag, and the nitrogen tail gas was recovered. The amount of residual unoxidized sodium calcium slag was about 5 wt % after performing the separation and titration analysis.

(3) The roasting product of step (2) was subjected to directional leaching in a three-neck boiling flask by using 300 mL of sodium hydroxide tetrahydrate (equivalent to a mass percentage concentration by weight of NaOH about 11%)+calcium hydroxide suspension (equivalent to a mass percentage concentration by weight of Ca(OH)$_2$ about 3%) at a temperature of −18° C. The mixture in said three-neck boiling flask was stirred for at a rotational speed of 150 rpm for 30 minutes, the three-neck boiling flask was introduced with the recovered nitrogen gas as a protective gas. A solid-liquid separation was then performed to obtain concentrated sodium hydroxide solution and calcium hydroxide solid; the concentrated sodium hydroxide solution was then diluted by adding 1,000 mL of deionized water to regenerate about 1,200 mL of sodium hydroxide tetrahydrate solution with a concentration of 11 wt %, wherein 300 mL of sodium hydroxide solution was spared for an use in the next batch, 900 mL of the remaining sodium hydroxide solution was the newly added sodium hydroxide product, another portion of the NaOH solution was entrained in the filter cake, and the alkaline washing solution obtained from the washing and filtering process may be returned for use in the next leaching process. The filter cake was dried to obtain about 61 grams of calcium hydroxide.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:
1. A method for sodium slag recovery, the method comprising:

(1) subjecting a liquid sodium slag to a gravity stratification to obtain pure metallic sodium and high calcium content sodium slag;
(2) roasting said high calcium content sodium slag to obtain a roasting slag; and
(3) leaching said roasting slag by using an alkaline liquor to obtain a sodium hydroxide solution and calcium hydroxide,
wherein the gravity stratification in step (1) is a supergravity centrifugation,
wherein a separation factor of the supergravity centrifugation in step (1) is within a range of 500-5,500, and
wherein the time for said supergravity centrifugation is within a range of 1-500 minutes.

2. The method of claim 1, wherein the sodium slag comprises sodium and calcium and wherein sodium is contained in an amount of 60-90 wt % and calcium is contained in an amount of 10-40 wt %, based on the total amount of said sodium slag.

3. The method of claim 1, wherein a separation factor of the supergravity centrifugation in step (1) is within a range of 1,500-4,500 and wherein the time for said supergravity centrifugation is within a range of 2-20 minutes.

4. The method of claim 1, wherein the roasting in step (2) further comprises the following steps:
(2-1) subjecting the high calcium content sodium slag to a first roasting to obtain a first roasted product slag; and
(2-2) pulverizing the first roasted product slag, and then subjecting the first roasted product slag to a second roasting to obtain the roasting slag.

5. The method of claim 4, wherein the first roasting in step (2-1) is carried out for 5-180 minutes, wherein the temperature of said first roasting in step (2-1) is within a range of 200-720° C., wherein the second roasting in step (2-2) is carried out for 10-240 minutes, and wherein the temperature of said second roasting in step (2-2) is within a range of 230-800° C.

6. The method of claim 5, wherein the first roasting in step (2-1) is carried out for 10-90 minutes, wherein the temperature of said first roasting in step (2-1) is within a range of 220-450° C., wherein the second roasting in step (2-2) is carried out for 10-60 minutes, and wherein the temperature of said second roasting in step (2-2) is within a range of 260-600° C.

7. The method of claim 4, wherein the first roasting in step (2-1) and the second roasting in step (2-2) are each independently a controllable oxygen roasting, wherein the controllable oxygen roasting causes conversion of the high calcium content sodium slag into sodium peroxide, sodium oxide, calcium oxide and residual sodium calcium slag under the condition of satisfying the safe operation, wherein the volumetric oxygen concentration of said first roasting in step (2-1) is within a range of 5-30%, wherein the oxygen flow rate of said first roasting in step (2-1) is within a range of 0.5-10 $m^3$/t-minute, in terms of per ton of high calcium content sodium slag, wherein the volumetric oxygen concentration during said second roasting in step (2-2) is within a range of 10-60%, and wherein the oxygen flow rate in the second roasting process of step (2-2) is within a range of 1-20 $m^3$/t-minute, in terms of per ton of first roasted product slag.

8. The method of claim 7, wherein the volumetric oxygen concentration of said first roasting in step (2-1) is within a range of 10-25%, wherein the oxygen flow rate of said first roasting in step (2-1) is within a range of 1-6 $m^3$/t-minutes, in terms of per ton of high calcium content sodium slag, wherein the volumetric oxygen concentration during said second roasting in step (2-2) is within a range of 15-40%, and wherein the oxygen flow rate in the second roasting process of step (2-2) is within a range of 1-10 $m^3$/t minute, in terms of per ton of first roasted product slag.

9. The method of claim 4, wherein the pulverizing in step (2-2) is performed to obtain a pulverized slag with a granularity of 10-160 mesh.

10. The method of claim 9, wherein the pulverizing in step (2-2) is performed to obtain a pulverized slag with a granularity of 20-80 mesh.

11. The method of claim 4, wherein the pulverizing is performed under a protective atmosphere provided by at least one of a first roasting tail gas, nitrogen gas, helium gas, argon gas and neon gas.

12. The method of claim 11, wherein the protective atmosphere is provided by the first roasting tail gas.

13. The method of claim 1, wherein a solute of the alkaline liquor in step (3) is a hydrate, wherein the concentration of said alkaline liquor is within a range of 20-100 wt %, based on the hydroxide hydrate, wherein a reaction temperature of the leaching is within a range of −18° C. to 45° C., wherein a reaction time of the leaching is within a range of 10-300 minutes, wherein the method further comprises subjecting the leached material to a solid-liquid separation to obtain a liquid and a solid, and wherein the method further comprises recycling at least part of said liquid to the leaching process for providing at least part of the alkaline liquor.

14. The method of claim 13, wherein a solute of the alkaline liquor in step (3) is a sodium hydroxide hydrate and/or a calcium hydroxide hydrate, wherein the concentration of said alkaline liquor is within a range of 30-100 wt %, based on the hydroxide hydrate, wherein a reaction temperature of the leaching is within a range of −15° C. to 30° C., and wherein a reaction time of the leaching is within a range of 15-60 minutes.

15. The method of claim 14, wherein a solute of the alkaline liquor in step (3) is a sodium hydroxide hydrate and wherein a reaction temperature of the leaching is within a range of −15° C. to 10° C.

16. An apparatus for the method of sodium slag recovery according to claim 1, the apparatus method comprising:
providing a stratification unit (1), a first roasting unit (2), a pulverizer (3), a second roasting unit (4) and a reaction kettle (5) connected in series,
wherein subjecting a liquid sodium slag to a gravity stratification to obtain pure metallic sodium and high calcium content sodium slag using the stratification unit (1) is used for stratification of the sodium slag to obtain pure metallic sodium and high calcium content sodium slag,
roasting said high calcium content sodium slag in the first roasting unit to obtain a roasting slag; and
leaching said roasting slag by using an alkaline liquor to obtain a sodium hydroxide solution and calcium hydroxide,
wherein the stratification unit is provided with a high calcium content sodium slag outlet, and the high calcium content sodium slag outlet is in communication with an inlet of the first roasting unit,
wherein the reaction kettle is used for leaching the roasting slag obtained from the second roasting unit with the alkali liquor,
wherein the gravity stratification step is a supergravity centrifugation,
wherein a separation factor of the supergravity centrifugation is within a range of 500-5,500, and wherein the time for said supergravity centrifugation is within a range of 1-500 minutes.

17. The apparatus method of claim 16, wherein the stratification unit comprises a supergravity centrifuge and wherein an inlet of the supergravity centrifuge is in communication with a liquid sodium slag supply unit.

18. The apparatus method of claim 16, wherein the first roasting unit further comprises a first roasting furnace for performing the first roasting, wherein the first roasting furnace is equipped with a first flowmeter and a first oxygen concentration meter for controlling an oxygen supply amount of the first roasting furnace, wherein said pulverizer is provided with a protective gas pipeline for supplying protective gas to said pulverizer to provide a protective atmosphere for crushing in the pulverizer, wherein the second roasting unit comprises a second roasting furnace for performing the second roasting, wherein the second roasting furnace is equipped with a second flowmeter and a second oxygen concentration meter for controlling the oxygen supply amount of the second roasting furnace, wherein the apparatus further comprises a solid-liquid separation device connected in series with the reaction kettle, the solid-liquid separation device being configured to subject the material obtained from the leaching of the reaction kettle to a solid-liquid separation to obtain a solid and a liquid, and wherein a liquid outlet of said solid-liquid separation device is in communication with an inlet of said reaction kettle.

19. The apparatus method of claim 18, wherein the first roasting unit comprises a tube furnace or a rotary kiln configured to perform the first roasting.

\* \* \* \* \*